United States Patent
Moore, Jr.

(10) Patent No.: US 12,340,145 B2
(45) Date of Patent: Jun. 24, 2025

(54) TECHNOLOGIES FOR PROVIDING AUDIO COMPONENTS/SESSIONS TO DEVICES

(71) Applicant: ARRIS Enterprises LLC, Suwanee, GA (US)

(72) Inventor: Richard Moore, Jr., Harleysville, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 124 days.

(21) Appl. No.: 17/459,287

(22) Filed: Aug. 27, 2021

(65) Prior Publication Data

US 2022/0113933 A1    Apr. 14, 2022

Related U.S. Application Data

(60) Provisional application No. 63/089,256, filed on Oct. 8, 2020.

(51) Int. Cl.
| | |
|---|---|
| G06F 3/16 | (2006.01) |
| G06F 3/0482 | (2013.01) |
| H04L 65/611 | (2022.01) |
| H04R 1/40 | (2006.01) |
| H04R 3/12 | (2006.01) |

(52) U.S. Cl.
CPC .......... G06F 3/165 (2013.01); G06F 3/0482 (2013.01); H04L 65/611 (2022.05); H04R 1/403 (2013.01); H04R 3/12 (2013.01)

(58) Field of Classification Search
None
See application file for complete search history.

(56) References Cited

U.S. PATENT DOCUMENTS

| | | | |
|---|---|---|---|
| 9,716,917 B2 * | 7/2017 | Dutta | H04N 21/25808 |
| 9,733,956 B2 | 8/2017 | Krishnaswamy et al. | |

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued Dec. 3, 2021, by the International Application Division Korean Intellectual Property Office in corresponding International Application No. PCT/US2021/047898. (9 pages).

*Primary Examiner* — Duc Nguyen
*Assistant Examiner* — Assad Mohammed
(74) *Attorney, Agent, or Firm* — Panitch Schwarze Belisario & Nadel LLP

(57) ABSTRACT

Technologies are disclosed for managing one or more audio components of media content, perhaps using devices that may be in communication with one or more speakers. For example, a media control device may receive a first media content, where the first media content may have at least a first audio component. A second media content may be received, where the second media content may have at least a second audio component. The first audio component may be assigned to at least a first speaker of the one or more speakers. The assignment may effectively restrict the second audio component from at least the first speaker of the one or more speakers. The first audio component may be provided via at least the first speaker of the one or more speakers. The second audio component may be provided via at least a second speaker of the one or more speakers.

21 Claims, 5 Drawing Sheets

(56) References Cited

U.S. PATENT DOCUMENTS

| | | | |
|---|---|---|---|
| 10,049,686 B1* | 8/2018 | Hera | G10L 21/0208 |
| 10,111,002 B1 | 10/2018 | Poulad | |
| 10,212,516 B1 | 2/2019 | Kallali Narayana et al. | |
| 2006/0262935 A1* | 11/2006 | Goose | H04S 3/002 |
| | | | 381/17 |
| 2008/0165176 A1* | 7/2008 | Archer | G09G 3/001 |
| | | | 345/213 |
| 2011/0161485 A1* | 6/2011 | George | H04L 43/16 |
| | | | 709/224 |
| 2017/0325044 A1 | 11/2017 | Ouborg et al. | |
| 2018/0035072 A1* | 2/2018 | Asarikuniyil | H04N 21/4438 |
| 2018/0060022 A1* | 3/2018 | Kozlov | G10L 19/167 |
| 2019/0349711 A1 | 11/2019 | Wang | |
| 2020/0267493 A1* | 8/2020 | Mouncer | H04S 7/303 |
| 2020/0314495 A1* | 10/2020 | Wittke | H04N 21/4623 |
| 2023/0079716 A1* | 3/2023 | Sambhwani | H04S 3/008 |

* cited by examiner

TECHNOLOGIES FOR PROVIDING AUDIO COMPONENTS/SESSIONS TO DEVICES

BACKGROUND

Media content may be provided by a plurality of media content network operators to home and/or business subscribers/viewers. Media content network operators (e.g., cable network operators, or satellite operators, etc.) may provide subscribers/viewers with various forms of media content, such as movies, concerts, premium media content, broadcast media content, and/or pay-per-view (PPV) media content, and/or the like.

At times, a user may view/listen to media content at a device, such as a mobile/wireless device (e.g., a cellphone, and/or a tablet, etc.), or at other, more stationary, devices (e.g., a set-top box, a television, etc.) perhaps while connected to a home and/or private communication network, or perhaps while the user is away from the home/private network and obtaining the media content from the Internet. The media content may include video content and audio content. The one or more devices with which the user may view/listen to the media content may process other video and/or audio signals/content, perhaps in addition to and/or simultaneously with, the video/audio of the media content.

SUMMARY

Technologies are disclosed for managing one or more audio components/sessions of media content, that may be performed by a media control device, for example. The media control device may be in communication with one or more speakers. The media control device may receive a first media content. The first media content may have at least a first audio component. A second media content may be received by the media control device. The second media content may have at least a second audio component. The first audio component may be assigned to at least a first speaker of the one or more speakers. The assignment may effectively restrict the second audio component from at least the first speaker of the one or more speakers. The first audio component may be provided via at least the first speaker of the one or more speakers. The second audio component may be provided via at least a second speaker of the one or more speakers.

In one or more scenarios, the second audio component may be assigned to at least the second speaker of the one or more speakers.

In one or more scenarios, the media control device may receive at least one input. The at least one input may indicate a selection for the assignment of the first audio component to at least the first speaker of the one or more speakers. The media control device may provide one or more selectable inputs that may correspond to the one or more speakers in communication with the media control device.

In one or more scenarios, the one or more selectable inputs may include one or more of: an input corresponding to a group of at least two speakers, an input corresponding to at least one type of speaker, an input corresponding to a physical location of at least one speaker, an input corresponding to a sound-direction-control capability of at least one speaker, an input corresponding to at least one audio-processing application configured on the media control device and associated with at least the first audio component, an input corresponding to a logical group of more than one speaker of the one or more speakers, an input corresponding to an automatically-determined at least one speaker, an input corresponding to a user-determined default selection of at least one speaker, an input corresponding to a pre-programmed default selection of at least one speaker, or one or more inputs respectively corresponding to each individual speaker of the one or more speakers, for example.

In one or more scenarios, perhaps for example as part of the assignment, among other scenarios, the media control device may determine to assign the first audio component to at least the first speaker of the one or more speakers based on one or more factors.

In one or more scenarios, the one or more factors may include one or more of: a type of sound corresponding to the first audio component, one or more audio-processing applications configured on the media control device and associated with at least the first audio component, at least one type of speaker of the one or more speakers, at least one frequency range corresponding to the first audio component, a physical location of at least one speaker, a sound-direction-control capability of at least one speaker, a logical group of more than one speaker of the one or more speakers, an automatically-determined at least one speaker, a user-determined default selection of at least one speaker, an automatically-determined default selection of at least one speaker, or a total number of speakers of the one or more speakers.

In one or more scenarios, the first media content may be a streamed media content and/or a broadcasted media content. The second media content may be at least one of: a phone call, a phone conference call, a video call, an Internet-based video chat session, or a video-conference session.

In one or more scenarios, the media control device may be at least one of: a set-top box, a home gateway, a mobile device, a television, or a personal computing device.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
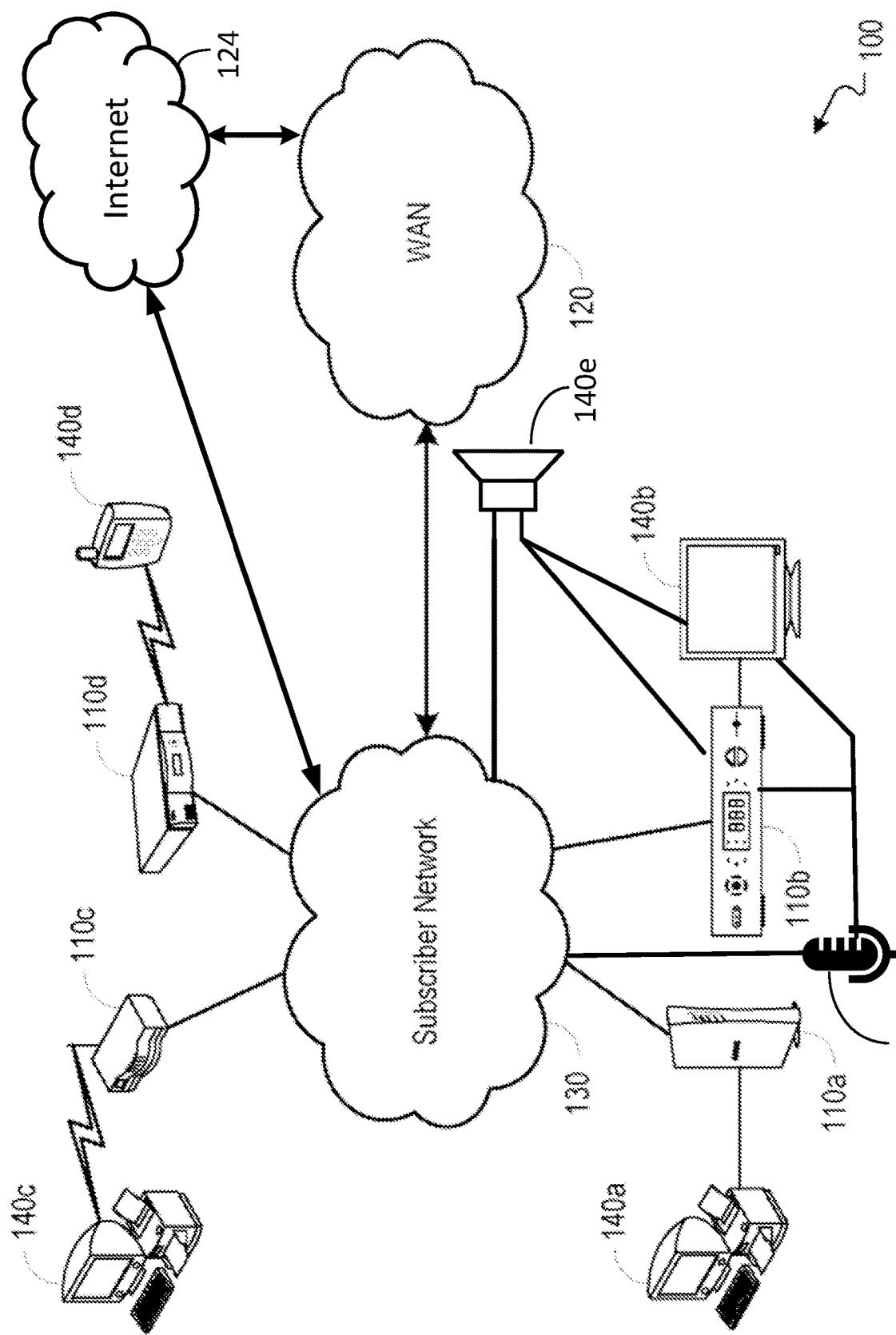
FIG. 1 is a block diagram illustrating an example network environment operable to deliver video and/or audio content throughout the network via one or more network devices, such as a consumer premises device (CPE) device, among other devices.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

FIG. 1 is a block diagram illustrating an example network environment 100 operable for a media content delivery network operator, or MSO, to deliver media content to subscribers/viewers. Media content may be provided via a consumer premise equipment (CPE) and/or network gateway device supported by the MSO, for example. In one or more scenarios, CPE devices 110a-d receive video service(s) and/or data service(s) from a wide area network (WAN) 120 via a connection to a subscriber network 130. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others.

The CPE devices can facilitate communications between the WAN 120 and client devices 140a-f. A cable modem or embedded MTA (eMTA) 110 a can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120. The media gateway 110d can facilitate communications between a mobile device 140d (e.g., a tablet computing device, a smartphone, a personal digital assistant (PDA) device, a laptop computing device, etc.; one or more devices being PC-based, iOS-based, Linux-based, and/or Android-based, etc.) and the WAN 120. One or more speaker devices (e.g., sound radiation devices/systems) 140e may be in communication with the Subscriber Network 130, set-top box 110b, and/or television 140b, etc.

The one or more speaker devices 140e (e.g., surround sound speakers, home theater speakers, other external wired/wireless speakers, loudspeakers, full-range drivers, subwoofers, woofers, mid-range drivers, tweeters, coaxial drivers, etc.) may broadcast at least an audio component of media content, among other audio signals/processes/applications. The one or more speaker devices 140e may possess the capability to radiate sound in pre-configured acoustical/physical patterns (e.g., a cone pattern, a directional pattern, etc.)

The one or more microphone devices 140f may be external/standalone microphone devices. Any of the client devices 140a-e may include internal microphone devices. The one or more speaker devices 140e (e.g., "speakers") and/or the one or more microphone devices (e.g., "microphones") may have wired and/or wireless connections (e.g., Bluetooth, Wi-Fi, private protocol communication network, etc.) to any of the other devices 140a-140d, the Subscriber Network 130, the WAN 120, and/or the Internet 124.

A user (not shown) may monitor (e.g., watch and/or listen to) media content on/from one or more of the devices 140a-140d, among other devices (not shown), for example. For various reasons, the user may monitor more than one media content, perhaps for example at substantially the same time. For example, one or more of the devices 140a-140d may provide video components/programs/sessions/service of media content along with applications that may have their own audio components/programs/sessions/service (e.g., digital assistants, voice calling, Internet radio, podcasts, game applications, etc.). The audio from those other applications can get muddled and/or lost, perhaps for example when that audio may be mixed with the video program (e.g., that may have its own audio components) and/or may be provided via the same speakers. This may cause difficulty for users in understanding the audio components from those other applications and/or the audio components of the video program.

The WAN network 120 and/or the subscriber network 130 may be implemented as any type of wired and/or wireless network, including a local area network (LAN), a wide area network (WAN), a global network (the Internet), etc. Accordingly, the WAN network 120 and/or the subscriber network 130 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

Figure 2:
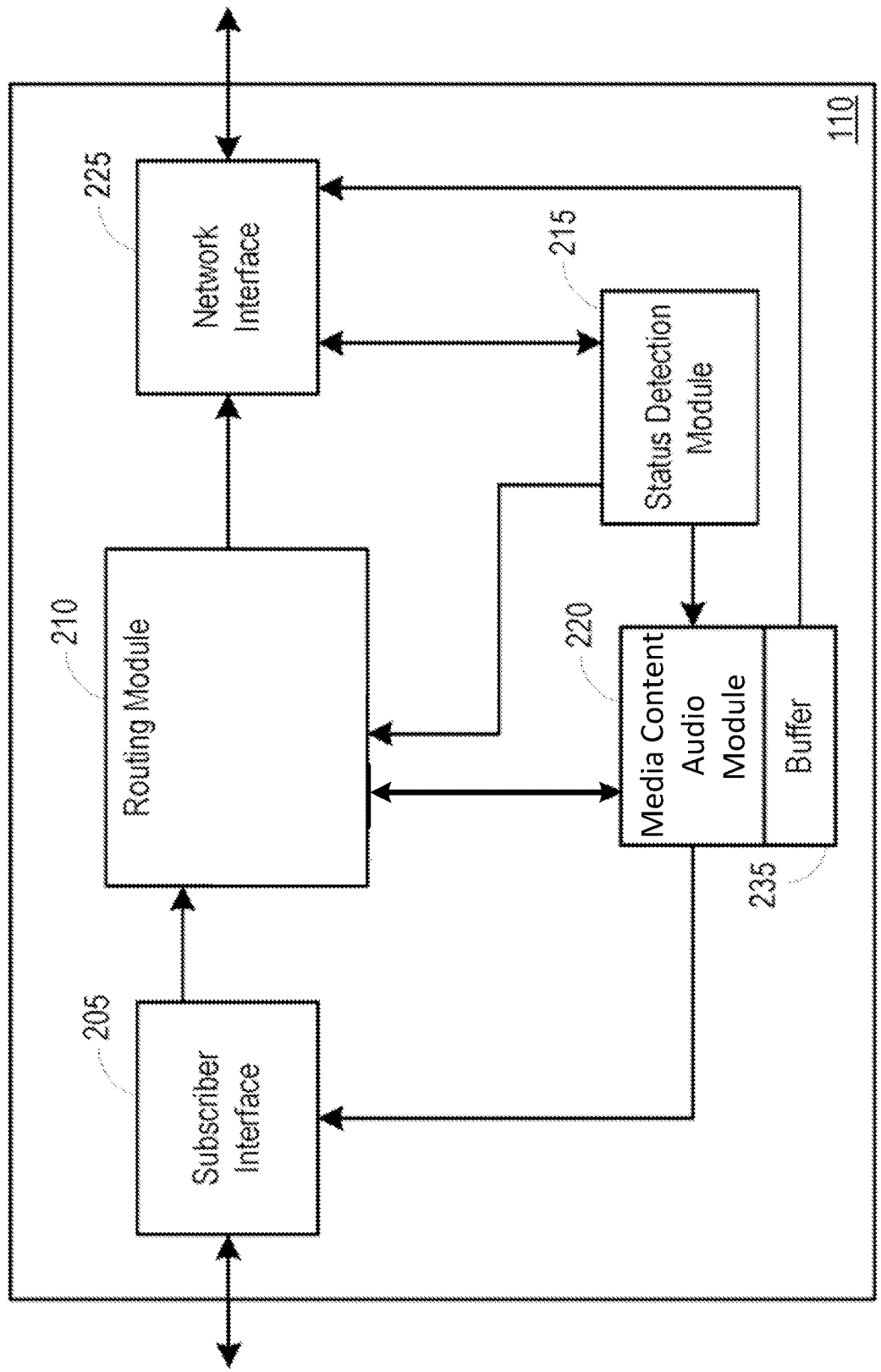
FIG. 2 is a block diagram illustrating an example CPE device of FIG. 1 that may be configured to deliver video and/or audio content to a subscriber.

FIG. 2 is a block diagram illustrating an example CPE device 110 operable to output audio/visual media content to one or more devices, such as for example, the television/monitor 140b, mobile device 140d, computer 140c, computer 140a, one or more speaker devices 140e, and/or one or more microphone devices 140f, etc. The CPE device 110 can include a subscriber interface 205, a routing module 210, a status detection module 215, a media content audio module 220, and/or a network interface 225.

In one or more scenarios, the CPE device 110 may receive a communication from a subscriber or subscriber device (e.g., subscriber device 140a-f of FIG. 1). For example, the communication can be a request for data or a service from a network (e.g., WAN 120 of FIG. 1). A communication received from a subscriber or subscriber device can be received as a resource identifier (e.g., URL, and/or an IP address, and/or other format).

In one or more scenarios, a routing module 210 may route a received communication to a network interface 225. The routing module 210 may route the communication to the network interface 225. The routing module may translate the received communication from a URL to an IP address.

In one or more scenarios, a user may assign/pin audio components of one or more "other" applications/media content to selected/determined/designated speaker device(s) in a multi-speaker device (e.g., home setting, business setting, etc.). For example, an audio component from a video program being watched may continue to play on the speaker(s) as may be (e.g., normally, typically, usually, etc.) configured, for example TV speakers. This may offer improved clarity of the audio components of the "other" one or more applications, as a user can select one or more speakers that may be physically closer to the user's ears than perhaps may be the TV speakers. In one or more scenarios, the user can assign the one or more audio components from the "other" applications to one or more speakers, perhaps for example based on the one or more speaker's location in the room/area. Perhaps for example, the physical separation between the video program audio component/session assigned/pinned speakers and the "other" application audio component/session assigned/pinned speakers may result in enhanced clarity for better understanding on the part of the user.

In one or more scenarios, the CPE device 110 can be configured to automatically select one or more speakers which are physically closer to the user's ears. For example, the subscriber interface 205 can have a wired or wireless connection to one or more sensors which are disposed or located within the setting. The one or more sensors can include an image sensor, acoustic sensors, thermal sensors or any other suitable device for detecting or determining a position of a user in proximity to one or more speakers within the setting. According to one scenario, the subscriber interface 205 can receive sensor data from the one or more sensors and provide the sensor data to the media content audio module 220. The media content audio module 220 can be configured analyze the sensor data to determine the location of the user in proximity to the one or more speakers within the setting. For example, in one or more scenarios, the sensor data can include image data generated by one or more cameras and the media content audio module 220 may perform image processing operations (e.g., object recognition, object tracking, etc.) to locate a position of the user relative to the one or more speakers within the setting. In one or more other scenarios, the sensor data can include acoustic data generated by one or more microphones (e.g., beam forming microphone or other suitable acoustic detection device) and the media content audio module 220 may perform signal processing operations (e.g., beam tracking) to locate a position of the user relative to a direction or location of the voice within the setting. It should be understood that the media content audio module can be configured to perform any type or form of signal or data processing operations according to the type of sensor(s) used within the setting. Once the location of the user within the setting is determined, the media content audio module 220 can identify the one or more speakers closest in proximity to the user and select a suitable speaker for output.

In one or more scenarios, for example, a surround sound home theater system may be in communication with a device with which a user may be monitoring more than one media content. The user may select/assign/pin one or more speakers of the surround sound system that results in the relatively "best" clarity for understanding the audio components/sessions from the "other" applications (e.g., a first media content) and/or from the video program audio components/sessions (e.g., a second media content) that may be provided via different speakers of the surround sound system.

For example, the user may select/assign/pin one or more speakers that have been paired with the one or more of the devices 140a-140d. The paired one or more speakers might not be part of the surround sound system, thus having the effect of restricting/blocking the video program audio components/session from being provided via the one or more paired speakers. In such scenarios, among others, the audio components/sessions from the "other" applications may be provided (e.g., without the audio components/sessions from the video program) via the one or more paired speakers, for example.

In one or more scenarios, the user may expressly select/assign/pin the audio components/sessions from the video program to/with the one or more speakers of the surround sound system, thus having the effect of restricting/blocking the video program audio components/sessions from being provided via the one or more paired speakers. Such selection/assignment/pinning may also have the effect of restricting/blocking the audio components/sessions from the "other" applications from being provided via the one or more speakers of the surround sound system.

For example, there are applications that may enable synchronized video program monitoring with several people (e.g., streamed video programs, broadcasted video programs, etc.), perhaps along with video conferencing among the people watching the video program. By using such applications, people in different physical/logical locations can watch the same video program while having a group dialog with one another, for example using video conferencing, at substantially the same time (e.g., a business meeting, a watch party, a multi-player gaming session, etc.). Without using the techniques disclosed herein, the audio components/sessions from the video conference may be mixed in with the audio components/sessions from the video program and may be provided via the same one or more speakers that may be in communication with whichever of the devices 140a-140d that may be used to monitor the video program and engage in the video conferencing. In such scenarios, the audio components/signals/sessions from the other people on the video conference call may be difficult to understand, perhaps for example because they likely get muddled/mixed with the audio components/sessions from the video program.

It may be useful to provide capabilities, techniques, methods, and/or devices that may allow devices that may be used to monitor media content and/or may be in communication with more than one speaker to assign audio components/sessions of media content to selected/designated different speakers. Capabilities, techniques, methods, and/or devices described herein may enable at least some audio components/sessions to be played/provided on/via selected/assigned/pinned one or more speakers, perhaps for example to enhance the clarity of those audio components/sessions, at least to some degree. In one or more scenarios, the enhanced clarity may be provided by physically/acoustically/logically separating substantially simultaneously provided audio components/sessions.

In one or more scenarios, a user may be presented (e.g., via a user interface, a list, etc.) with the one or more audio components/sessions/sources/signals that they may monitor and/or the one or more speakers that may provide those one or more audio components/sessions/sources/signals. The one or more audio components/sessions/sources/signals may include one or more other applications that may be active (e.g. digital assistant, video call, voice call, Internet radio program, podcast, game, etc.). In one or more scenarios, any of the devices 140a-140d may be configured to permit the user to send any audio components/sessions/sources/signals to one or more speakers. In one or more scenarios, any of the devices 140a-140d may be configured to permit the user (e.g., via a user interface, a list, etc.) to send any audio components/sessions/sources/signals to one or more pre-configured and/or determined speakers and/or group(s) of speakers, for example.

For example, using a previous example described herein, using any of the devices 140a-140d that may be in communication with a surround sound speaker system, the video program audio component/session may be provided via the one or more speakers of the surround sound speaker system in the typical surround sound way. The user may select/assign/pin one or more other application audio components/sessions to one or more of the surround sound system speakers. For example, the user might decide to have the audio component/session corresponding to a person on an audio or video call be provided via (e.g., via only) the left rear speaker of a surround sound system. The user may wish to do this perhaps for example because the user may be sitting closest to that left rear speaker of the surround sound system.

In one or more scenarios, such assignment/selection/ pinning may effectively restrict/block the video program audio components/sessions from the left rear speaker of the surround sound system. In one or more scenarios, such assignment/selection/pinning may effectively restrict/block the audio component/session corresponding to the person on the audio or video call from the one or more speakers of the surround sound system other than the left rear speaker of the surround sound system.

By way of further example, the user may select/assign/pin the video program audio components/sessions to be provided via (e.g., via only) the front left speaker, front right speaker, and the middle speakers of the surround sound system. The user may assign/select/pin the audio component/session corresponding to the person on the audio or video call to the remaining surround sound system speakers (e.g., the left rear speaker and the right rear speaker in a 5.1 surround sound system).

In one or more scenarios, such assignment/selection/ pinning may effectively restrict/block the video program audio components/sessions from the left rear speaker and the right rear speaker of the surround sound system. In one or more scenarios, such assignment/selection/pinning may effectively restrict/block the audio component/session corresponding to the person on the audio or video call from the front left speaker, front right speaker, and the middle speakers of the surround sound system.

In one or more scenarios, the media content audio module 220 may be configured to manage one or more audio components/sessions of media content. The management techniques may be performed by any of the devices 140a-140d (e.g., media control devices). The media control device may be in communication with one or more speakers.

The media content audio module 220 may be configured to receive a media content (e.g., a first media content). The first media content may have at least a first audio component/session. A second media content may be received, where the second media content may have at least a second audio component.

The media content audio module 220 may be configured to assign/select/pin the first audio component to at least a first speaker of the one or more speakers. The assignment may effectively restrict/block the second audio component from at least the first speaker of the one or more speakers.

The media content audio module 22 may be configured to provide the first audio component via at least the first speaker of the one or more speakers. The second audio component may be provided via at least a second speaker of the one or more speakers.

In one or more scenarios, the media content audio module 220 may be configured to assign/select/pin the second audio component to at least the second speaker of the one or more speakers.

In one or more scenarios, the media content audio module 220 may be configured to receive at least one input (e.g., from a user). The at least one input may indicate a selection for the assignment/pinning of the first audio component to at least the first speaker of the one or more speakers.

In one or more scenarios, the media content audio module 220 may be configured to provide (e.g., via a user interface, a list, etc.) one or more selectable inputs that may correspond to the one or more speakers in communication with the media control device.

In one more scenarios, the media content audio module 220 may be configured such that the one or more selectable inputs may include an input corresponding to a group of at least two speakers of the one or more speakers, an input corresponding to at least one type of speaker of the one or more speakers, an input corresponding to a physical location of at least one speaker of the one or more speakers, an input corresponding to a sound-direction-control capability of at least one speaker of the one or more speakers, an input corresponding to at least one audio-processing application configured on the media control device and associated with at least the first audio component, an input corresponding to a logical group of more than one speaker of the one or more speakers, an input corresponding to an automatically-determined at least one speaker of the one or more speakers, an input corresponding to a user-determined default selection of at least one speaker of the one or more speakers, an input corresponding to a pre-programmed default selection of at least one speaker of the one or more speakers, and/or one or more inputs respectively corresponding to each individual speaker of the one or more speakers, for example.

In one or more scenarios, the media content audio module 220 may be configured such to assign/select/pin the first audio component/session may include a determination to assign the first audio component/session to at least the first speaker of the one or more speakers based on one or more factors.

In one or more scenarios, the media content audio module 220 may be configured such that the one or more factors may include a type of sound corresponding to the first audio component (e.g., a conversation, a town hall, an emergency announcement, etc.), one or more audio-processing applications configured on the media control device and associated with at least the first audio component (e.g., video conferencing application, voice calling application, multimedia streaming application, social media application, etc.), at least one type of speaker of the one or more speakers, at least one frequency range corresponding to the first audio component, a physical location of at least one speaker of the one or more speakers, a sound-direction-control capability of at least one speaker of the one or more speakers, a logical group of more than one speaker of the one or more speakers, an automatically-determined at least one speaker of the one or more speakers, a user-determined default selection of at least one speaker of the one or more speakers, an automatically-determined default selection of at least one speaker of the one or more speakers, and/or a total number of speakers of the one or more speakers.

In one or more scenarios, the first media content may be a streamed media content, and/or a broadcasted media content, for example. The second media content may be a phone call, a phone conference call, a video call, an Internet-based video chat session, and/or a video-conference session, a game application, a telemedicine application, a security camera monitoring application, or any other suitable application for communicating or streaming multimedia, audio, and/or video data for example.

The routing module 210 can route communications, requests, determinations, and/or detections of audio component/session assignments to/from the media content audio module 220. For example, the routing module 210 can translate the communications, requests, determinations, and/ or detections of audio component/session assignments into and/or with an address (e.g., IP address) associated with the media content audio module 220. The status detection module 215 may monitor the network connection status of the CPE device 110.

The status detection module 215 may determine the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, digital subscriber lines, etc.) that are used in the connection of the CPE device 110 to a network. This may include physical status detection (e.g., physical mapping to signal). If no signal is detected, a physical component may be broken (e.g., broken line or disconnected plug, etc.). A prompt can instruct a subscriber to check an associated connector or line.

The status detection module 215 can monitor the status of the network and/or data link layer associated with the CPE device 110. For example, the status detection module 215 can monitor the CPE device's connection to a host server (e.g., dynamic host configuration protocol server) and/or the status of configuration information received from the host server. For example, the status detection module 215 can monitor the CPE device's connection to a packet routing server (e.g., a point-to-point protocol PPP server) and/or subscriber credentials such as a username and password associated with the packet routing server. Data link layer status may include failed (synchronization failure), connected, on-doing (synchronizing), and others. In response to a failure, a re-scan for a cable line and/or retraining for DSL line may be attempted.

The communications, requests, determinations, and/or detections of the audio component/session assignments may be transmitted and/or stored in one or more files, such as text files (e.g., Hypertext Transfer Protocol (HTTP) files), among other type of files.

The CPE device 110 may store one or more, or multiple, files that may be ordered (e.g., hierarchically according to a specific order) for carrying out one or more actions in the setup of a device (e.g., set-top box 110*b*). The media content audio module 220 may include a buffer 235. The buffer 235 can store a subscriber communication (e.g., URL or IP address received from the subscriber) and/or the communications, requests, determinations, and/or detections of audio component/session assignments. In one or more scenarios, perhaps for example when the status detection module 215 determines that a network connection issue might no longer exist, the buffer 235 can output the subscriber communication and/or the communications, requests, determinations, and/or detections audio component/session assignments through the network interface 225.

In one or more scenarios, the media content may include one or more of over-the-top (OTT) video, cable video, broadcast video, and/or satellite video, among other types of video content.

Figure 3:
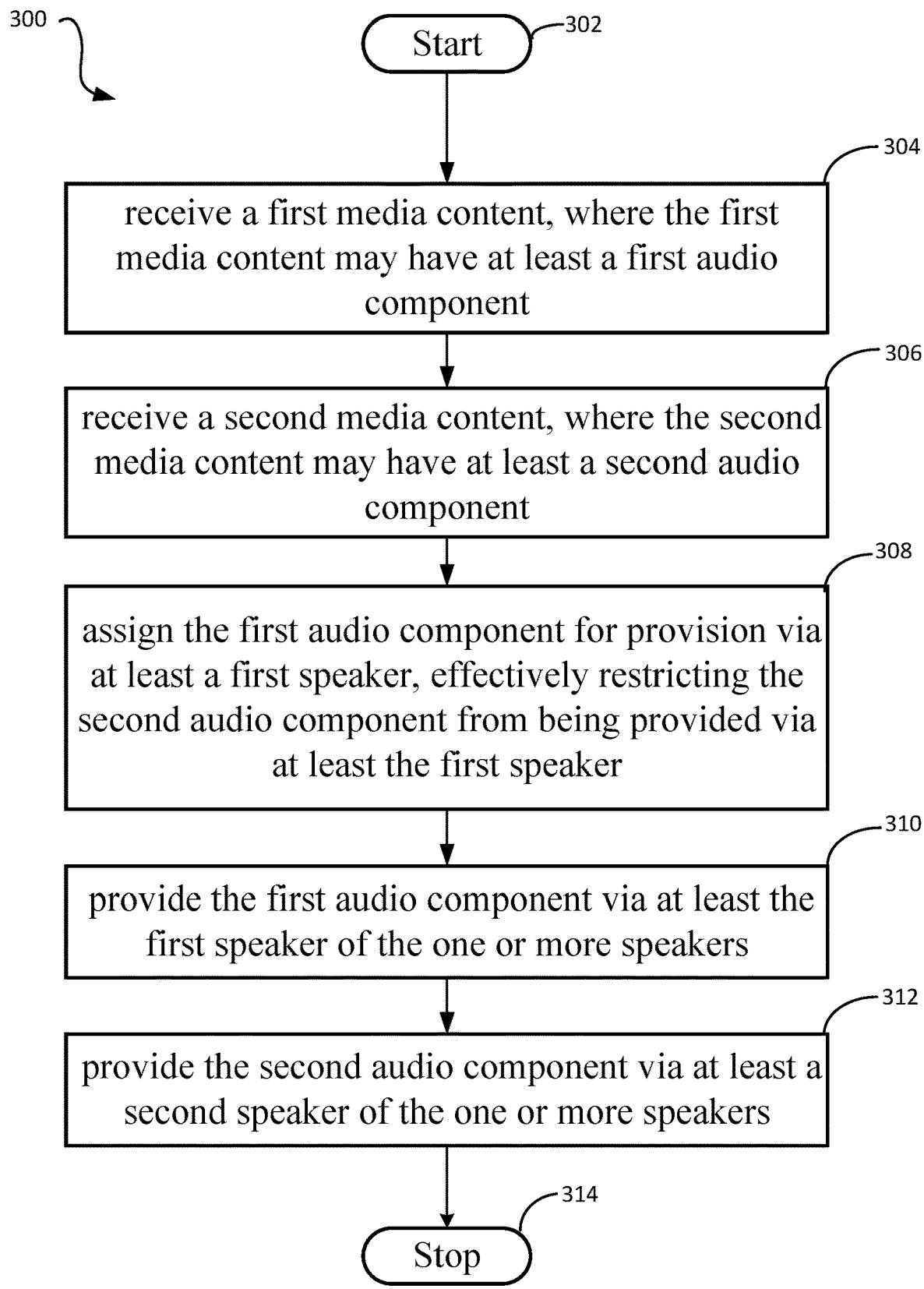
FIG. 3 is an example flow diagram of at least one technique for managing one or more audio components/sessions of media content.

Referring now to FIG. 3, an example method 300 illustrates a technique for managing one or more audio components/sessions of media content that may be performed by a media control device. The media control device may be in communication with one or more speakers. At 302, the process may start. At 304, the media control device may receive a first media content. The first media content may have at least a first audio component.

At 306, the media control device may receive a second media content. The second media content may have at least a second audio component. At 308, the first audio component may be assigned to at least a first speaker of the one or more speakers. The assignment may effectively restrict the second audio component from at least the first speaker of the one or more speakers.

At 310, the first audio component may be provided via at least the first speaker of the one or more speakers. At 312, the second audio component may be provided via at least a second speaker of the one or more speakers.

At 314 the process may stop or restart. In one or more scenarios, the media control device may be a set-top box, a mobile device, a television, a personal computing device, and/or a media (e.g., a home) gateway.

Figure 4:
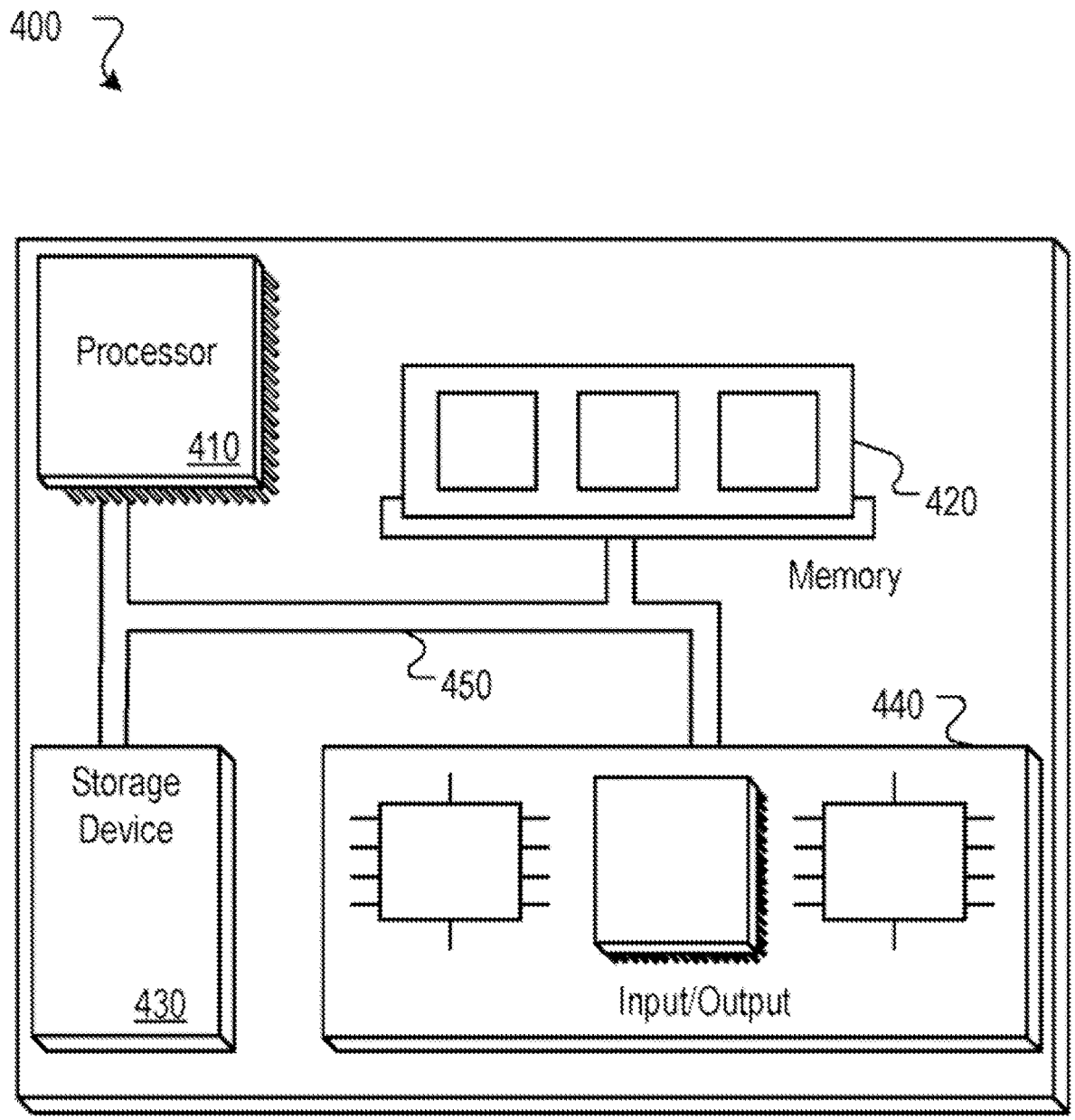
FIG. 4 is a block diagram of a hardware configuration of an example device that may deliver video and/or audio content, such as the CPE device of FIG. 2.

FIG. 4 is a block diagram of a hardware configuration of an example device that may deliver media content (e.g., video and/or audio content), such as the CPE device of FIG. 2. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit. The memory 420 can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and receive communications from one or more networks (e.g., subscriber network 120 of FIG. 1).

Figure 5:
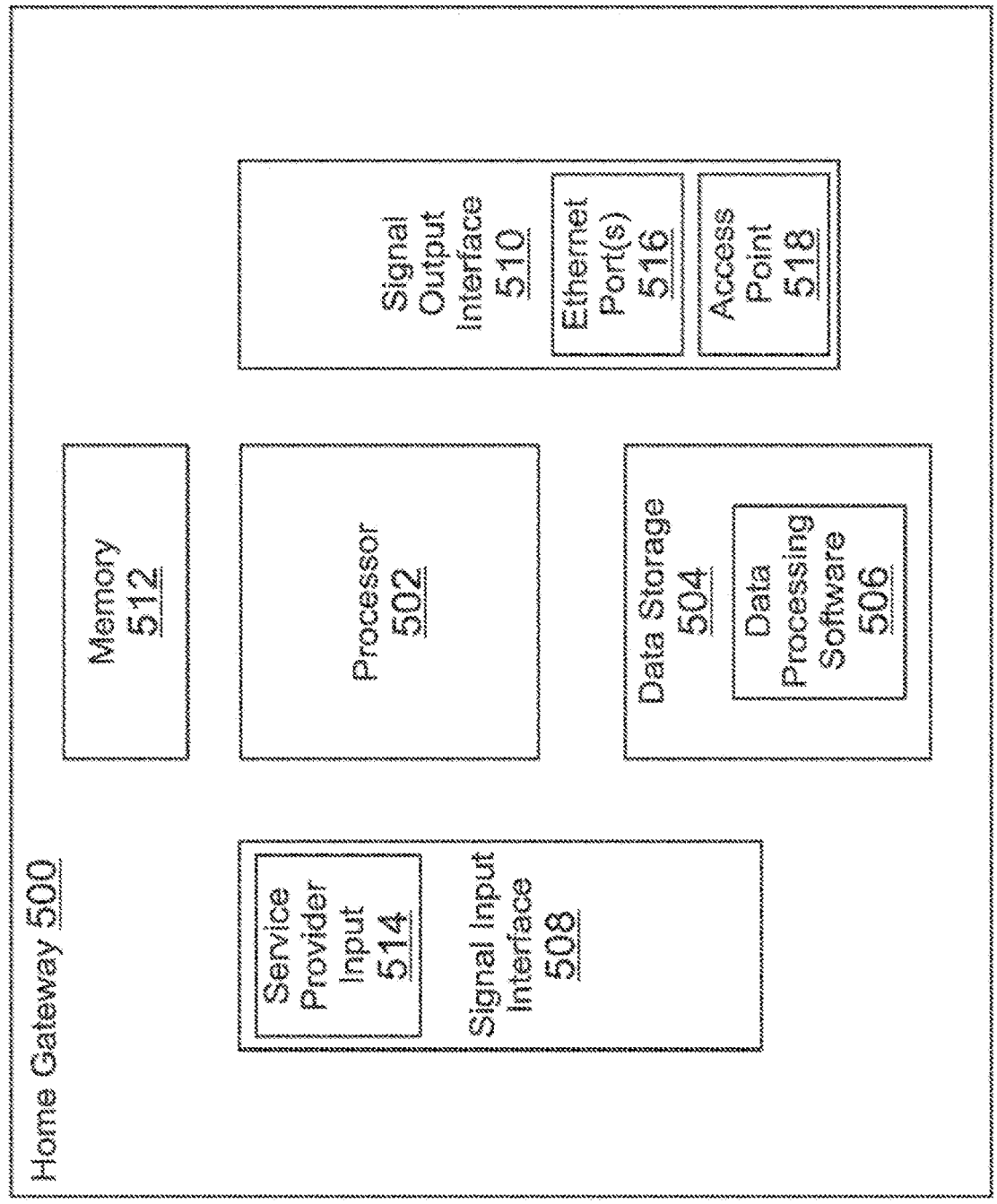
FIG. 5 is a block diagram of a hardware configuration of an example device that may deliver video and/or audio content, such as a home gateway.

FIG. 5 is a block diagram of a hardware configuration of an example device that may deliver media content (e.g., video and/or audio content), such as a home gateway. The home gateway 500 may be constructed in a similar manner to set-top box 400 in that the architecture may be built around a general-purpose processor, processor 502, and/or an application specific chip set such as designed for use in a Data Over Cable Service Interface Specification (DOCSIS), a Gigabit Passive Optical Network (GPON), and/or a Digital Subscriber Line (DSL) modem. As with processor 402, the general-purpose processor 502 may also be an off-the-shelf processor. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to set top box 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on general-purpose processor 502 to prepare the received signals (e.g., code, decode, etc.). The output of the data processing software 506 may be output by signal output interface 510, e.g., Ethernet port 516 and/or wireless access point 518.

Those skilled in the art will appreciate that the disclosed subject matter improves upon methods and/or apparatuses for mitigating audio clarity issues that may arise while monitoring more than one media content, where the media content may have their own audio components/sessions. This may be useful in one or more scenarios, for example with devices that may be used to monitor media content and that may be communication with more than one speaker.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. The subject matter described in this specification can be implemented as one or more computer program products, e.g., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and/or logic flows described in this specification may be performed by one or more programmable processors executing one or more computer programs to perform functions by operating on input data and/or generating output thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification contains many specific implementation details, these should not be construed as limitations on the scope of any invention or of what may be claimed, but rather as descriptions of features that may be specific to described implementations. Certain features that are described in this specification in the context of separate implementations can also be implemented in combination in perhaps one implementation. Various features that are described in the context of perhaps one implementation can also be implemented in multiple combinations separately or in any suitable sub-combination. Although features may be described above as acting in certain combinations and perhaps even initially claimed as such, one or more features from a claimed combination can in some cases be excised from the combination, and the claimed combination may be directed to a sub-combination or variation of a sub-combination.

While operations may be depicted in the drawings in a particular order, this should not be understood as requiring that such operations be performed in the particular order shown or in sequential order, or that all illustrated operations be performed, to achieve desirable results. The described program components and/or systems can generally be integrated together in a single software product or packaged into multiple software products.

Examples of the subject matter described in this specification have been described. The actions recited in the claims can be performed in a different order and still achieve desirable results, unless expressly noted otherwise. For example, the processes depicted in the accompanying figures do not necessarily require the particular order shown, or sequential order, to achieve desirable results. Multitasking and parallel processing may be advantageous.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for managing one or more audio components of media content performed by a media control device, the media control device being in communication with one or more speakers, the method comprising:
   receiving, by the media control device, a request for a first media content from a first client device;
   receiving the first media content, by the media control device, the first media content having at least a first video component and a first audio component;
   receiving, by the media control device, a request for a second media content from a second client device;
   receiving the second media content, by the media control device, the second media content having at least a second audio component;
   assigning, by the media control device, the first audio component to at least a first speaker of the one or more speakers, the assigning effectively restricting the second audio component from at least the first speaker of the one or more speakers;
   transmitting, by the media control device, the first video component to the first client device;
   transmitting, by the media control device, the first audio component to at least the first speaker of the one or more speakers;
   transmitting, by the media control device, the second video component to the second client device; and
   transmitting, by the media control device, the second audio component to at least a second speaker of the one or more speakers.

2. The method of claim 1, wherein the media control device is connected to one or more sensors for detecting a location of a user, the method further comprising:
   receiving, by the media control device, sensor data from the one or more sensors; and
   assigning, by the media control device, the first audio component to at least the first speaker of the one or more speakers based on the received sensor data.

3. The method of claim 1, further comprising:
   assigning, by the media control device, the second audio component to at least the second speaker of the one or more speakers; and
   receiving, by the media control device, at least one input indicating a selection for the assigning the first audio component to at least the first speaker of the one or more speakers.

4. The method of claim 3, further comprising:
   providing, by the media control device, one or more selectable inputs corresponding to the one or more speakers in communication with the media control device.

5. The method of claim 4, wherein the one or more selectable inputs include one or more of: an input corresponding to a group of at least two speakers, an input corresponding to at least one type of speaker, an input corresponding to a physical location of at least one speaker, an input corresponding to a sound-direction-control capability of at least one speaker, an input corresponding to at least one audio-processing application configured on the media control device and associated with at least the first audio component, an input corresponding to a logical group of more than one speaker of the one or more speakers, an input corresponding to an automatically-determined at least one speaker, an input corresponding to a user-determined default selection of at least one speaker, an input corresponding to a pre-programmed default selection of at least one speaker, or one or more inputs respectively corresponding to each individual speaker of the one or more speakers.

6. The method of claim 1, wherein the assigning further comprises:
   determining, by the media control device, to assign the first audio component to at least the first speaker of the one or more speakers based on one or more factors.

7. The method of claim 6, wherein the one or more factors include one or more of: a type of sound corresponding to the first audio component, one or more audio-processing applications configured on the media control device and associated with at least the first audio component, at least one type of speaker of the one or more speakers, at least one frequency range corresponding to the first audio component, a physical location of at least one speaker, a sound-direction-control capability of at least one speaker, a logical group of more than one speaker of the one or more speakers, an automatically-determined at least one speaker, a user-determined default selection of at least one speaker, an automatically-determined default selection of at least one speaker, or a total number of speakers of the one or more speakers.

8. The method of claim 1, wherein the first media content is at least one of: a streamed media content, or a broadcasted media content;
   the second media content is at least one of: a phone call, a phone conference call, a video call, an Internet-based video chat session, or a video-conference session; and
   the media control device is at least one of: a set-top box, a home gateway, a mobile device, a television, or a personal computing device.

9. A media control device configured to provide media content, the media control device being in communication with one or more speakers, the device comprising:
   a memory;
   a transceiver; and
   a processor, the processor configured at least to:
      receive a request for a first media content from a first client device;
      receive the first media content, the first media content having at least a first audio component;
      receive a request for a second media content from a second client device;
      receive the second media content, the second media content having at least a second video component and a second audio component;
      perform an assignment of the first audio component to at least a first speaker of the one or more speakers, the assignment creating an effective restriction of the second audio component from at least the first speaker of the one or more speakers;
      transmit the first video component to the first client device;
      transmit the first audio component to at least the first speaker of the one or more speakers;
      transmit the second video component to the second client device; and
      transmit the second audio component to at least a second speaker of the one or more speakers.

10. The device of claim 9, comprising:
    one or more sensors configured to detect a location of a user,
    wherein the processor is further configured to perform the assignment of the first audio component to at least a first speaker of the one or more speakers based on sensor data received from the one or more sensors.

11. The device of claim 9, wherein the processor is further configured to:
assign the second audio component to at least the second speaker of the one or more speakers; and
receive at least one input indicating a selection for the assignment of the first audio component to at least the first speaker of the one or more speakers.

12. The device of claim 11, wherein the processor is further configured to:
provide one or more selectable inputs corresponding to the one or more speakers in communication with the media control device.

13. The device of claim 12, wherein the processor is further configured such that the one or more selectable inputs include one or more of: an input corresponding to a group of at least two speakers, an input corresponding to at least one type of speaker, an input corresponding to a physical location of at least one speaker, an input corresponding to a sound-direction-control capability of at least one speaker, an input corresponding to at least one audio-processing application configured on the media control device and associated with at least the first audio component, an input corresponding to a logical group of more than one speaker of the one or more speakers, an input corresponding to an automatically-determined at least one speaker, an input corresponding to a user-determined default selection of at least one speaker, an input corresponding to a pre-programmed default selection of at least one speaker, or one or more inputs respectively corresponding to each individual speaker of the one or more speakers.

14. The device of claim 9, wherein the processor is further configured to:
determine to perform the assignment of the first audio component to at least the first speaker of the one or more speakers based on one or more factors.

15. The device of claim 14, wherein the processor is further configured such that the one or more factors include one or more of: a type of sound corresponding to the first audio component, one or more audio-processing applications configured on the media control device and associated with at least the first audio component, at least one type of speaker of the one or more speakers, at least one frequency range corresponding to the first audio component, a physical location of at least one speaker, a sound-direction-control capability of at least one speaker, a logical group of more than one speaker of the one or more speakers, an automatically-determined at least one speaker, a user-determined default selection of at least one speaker, an automatically-determined default selection of at least one speaker, or a total number of speakers of the one or more speakers.

16. The device of claim 10, wherein the first media content is at least one of: a streamed media content, or a broadcasted media content, and the second media content is at least one of: a phone call, a phone conference call, a video call, an Internet-based video chat session, a video-conference session, a game application, a telemedicine application, and a security camera monitoring application.

17. The device of claim 10, wherein the media control device is at least one of: a set-top box, a home gateway, a mobile device, a television, or a personal computing device.

18. A non-transitory computer readable medium having instructions stored thereon, the instructions causing at least one processor of a media control device to perform one or more operations, the media control device being in communication with one or more speakers, the one or more operations comprising at least:
receiving, by the media control device, a request for a first media content from a first client device;
receiving the first media content, by the media control device, the first media content having at least a first video component and a first audio component;
receiving, by the media control device, a request for a second media content from a second client device;
receiving the second media content, by the media control device, the second media content having at least a second video component and a second audio component;
assigning, by the media control device, the first audio component to at least a first speaker of the one or more speakers, the assigning effectively restricting the second audio component from at least the first speaker of the one or more speakers;
transmitting, by the media control device, the first video component to the first client device;
transmitting, by the media control device, the first audio component to at least the first speaker of the one or more speakers;
transmitting, by the media control device, the second video component to the second client device; and
transmitting, by the media control device, the second audio component to at least a second speaker of the one or more speakers.

19. The non-transitory computer readable medium of claim 18, wherein the one or more operations further comprise:
receiving at least one input indicating a selection for the assigning the first audio component to at least the first speaker of the one or more speakers; and
providing one or more selectable inputs corresponding to the one or more speakers in communication with the media control device, wherein the one or more selectable inputs include one or more of: an input corresponding to a group of at least two speakers, an input corresponding to at least one type of speaker, an input corresponding to a physical location of at least one speaker, an input corresponding to a sound-direction-control capability of at least one speaker, an input corresponding to at least one audio-processing application configured on the media control device and associated with at least the first audio component, an input corresponding to a logical group of more than one speaker of the one or more speakers, an input corresponding to an automatically-determined at least one speaker, an input corresponding to a user-determined default selection of at least one speaker, an input corresponding to a pre-programmed default selection of at least one speaker, or one or more inputs respectively corresponding to each individual speaker of the one or more speakers.

20. The non-transitory computer readable medium of claim 18, wherein the one or more operations further comprise:
determining to assign the first audio component to at least the first speaker of the one or more speakers based on one or more factors, wherein the one or more factors include one or more of: a type of sound corresponding to the first audio component, one or more audio-processing applications configured on the media control device and associated with at least the first audio component, at least one type of speaker of the one or more speakers, at least one frequency range corresponding to the first audio component, a physical location of at least one speaker, a sound-directioncontrol capability of at least one speaker, a logical group of more than one speaker of the one or more speakers, an automatically-determined at least one speaker, a user-determined default selection of at least one speaker, an automatically-determined default selection of at least one speaker, or a total number of speakers of the one or more speakers.

21. A method for managing one or more audio components of media content performed by a media control device, the media control device being in communication with one or more speakers, the method comprising:

receiving, by the media control device, a request for a first media content from a first client device;

receiving the first media content, by the media control device, the first media content having at least a first video component and a first audio component;

receiving, by the media control device, a request for a second media content from a second client device;

receiving the second media content, by the media control device, the second media content having at least a second audio component;

assigning, by the media control device, the first audio component to at least a first speaker of the one or more speakers, the assigning effectively restricting the second audio component from at least the first speaker of the one or more speakers, wherein the assigning the first audio component to the first speaker of the one or more speakers includes:

determining, by the media control device, to assign the first audio component to at least the first speaker of the one or more speakers based on one or more factors, wherein the one or more factors include one or more of: a type of sound corresponding to the first audio component, one or more audio-processing applications configured on the media control device and associated with at least the first audio component, at least one type of speaker of the one or more speakers, at least one frequency range corresponding to the first audio component, a physical location of at least one speaker, a sound-direction-control capability of at least one speaker, a logical group of more than one speaker of the one or more speakers, an automatically-determined at least one speaker, an automatically-determined default selection of at least one speaker, or a total number of speakers of the one or more speakers;

transmitting, by the media control device, the first video component to the first client device;

transmitting, by the media control device, the first audio component to at least the first speaker of the one or more speakers;

transmitting, by the media control device, the second video component to the second client device; and transmitting, by the media control device, the second audio component to at least a second speaker of the one or more speakers.

\* \* \* \* \*